Oct. 31, 1961   R. A. KNAPP ET AL   3,007,048
MEASURING AND CONTROLLING SYSTEM
Filed April 23, 1958   3 Sheets-Sheet 1

INVENTORS
ROBERT A. KNAPP
JACK G. CRUMP

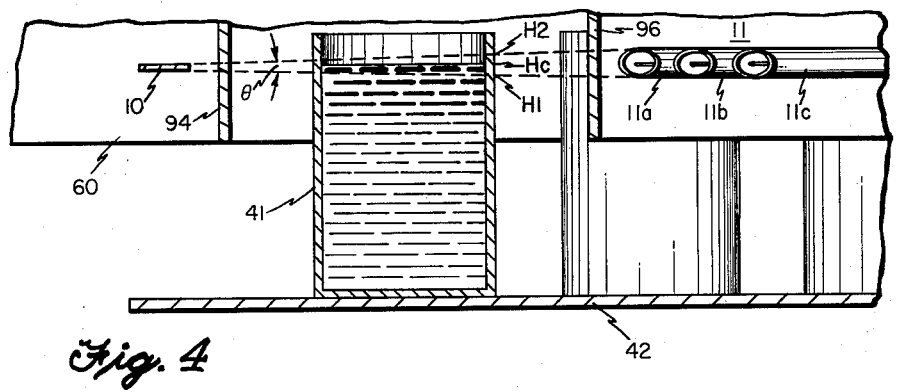
Fig. 4
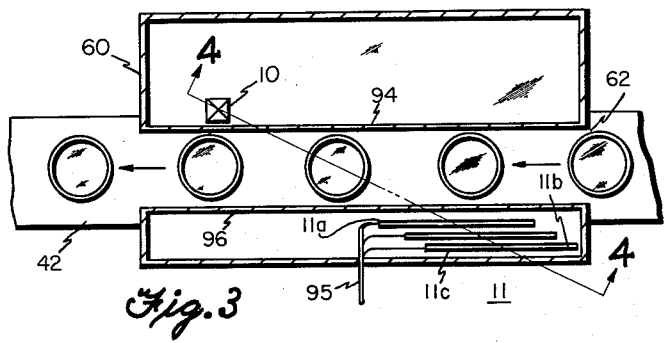
Fig. 3
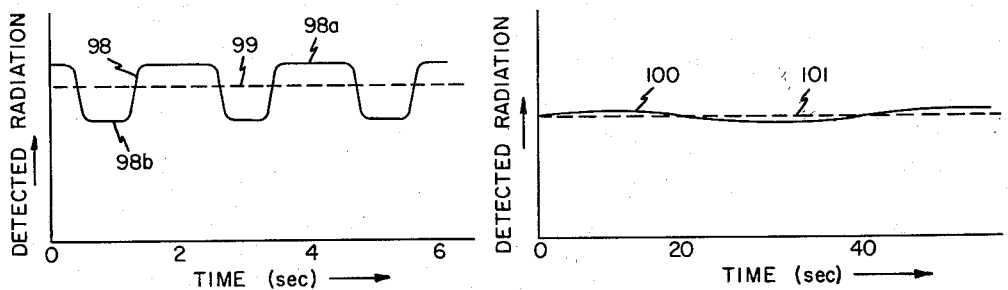
Fig. 5
Fig. 6
INVENTORS
ROBERT A. KNAPP
JACK G. CRUMP

United States Patent Office 3,007,048
Patented Oct. 31, 1961

3,007,048
MEASURING AND CONTROLLING SYSTEM
Robert A. Knapp and Jack G. Crump, Columbus, Ohio, assignors to Industrial Nucleonics Corporation, a corporation of Ohio
Filed Apr. 23, 1958, Ser. No. 730,472
8 Claims. (Cl. 250—43.5)

The present invention relates generally to automatic dispensing machines for filling containers and more specifically to method and means for measuring and controlling the height of material deposited in the containers.

Numerous companies presently package various types of goods in suitable containers before shipping to retail outlets for consumer sale. These consumer products may range from toothpaste in squeeze-tubes and bottle beverages to canned soups. A specified amount of goods is predetermined for each container and it is, for obvious reasons, in the economic interest of the packager to maintain this amount within limits in each container. In the interest of conserving considerable time and labor, the task of allotting a specified volume of material to empty containers has been almost universally assumed by automatic dispensing machinery. Automatic dispensing machines have been designed to fill various types of empty containers with a controllable volume of material and may assume any particular configuration adaptable to the nature of the material being dispensed. Further, these containers are filled on an assembly line in which empty containers are swiftly conveyed to the dispensing machine so that a considerable number may be filled during a certain period.

From the consumer's standpoint, a number of sales may be adversely affected if the container does not contain the stated quantity of material. In addition, the many legal requirements, ranging from local ordinances to Federal control of certain products in commerce, make it imperative that the containers do contain the specified amount. Conversely, if a packager continually sells products containing more material in each container than the specified amount, an apparent loss of profits will result. Purchaser satisfaction and an economically operating organization may both be realized by control of the automatic dispensing machines to maintain the specified quantity of container fill material.

It is known that the amount or volume of material placed in a container is directly proportional to the height to which it is filled; therefore, to control a dispensing machine, that is, to accurately maintain this fill height, it is necessary to precisely measure the container fill height.

In the systems heretofore known, fill level is ascertained through visual observation or through the utilization of X-ray inspection techniques. The former method requires human operators visually estimating the height to which containers are filled. Besides lacking the accuracy required for precise fill height control, this technique is not useable on opaque containers.

The X-ray method of fill height determination comprises a system in which an intense beam of X-rays is passed through the containers, at the desired fill height, toward a suitable detector, usually a semiconductor material such as cadmium or mercury sulphide. This inspection device merely determines whether or not the containers are filled to the desired fill height. Although an X-ray system may be utilized in a process where underfilled or overfilled containers are rejected from the assembly line, the information is not adaptable to a fill height control system. A further disadvantage of the X-ray fill height inspection method is that bulky power supply equipment is needed to provide the high operating potentials required for intense X-ray generation. This means that such a system would require a considerable area where space is already at a premium. Also prevalent to such applications is the health hazard attendant to such X-ray radiation.

The present invention provides method and means for accurately measuring the height of material placed in successive containers by a dispensing machine engaged in a continuous filling process. A fill height measuring unit utilizing a nuclear radiation source and detector provides an electrical potential translatable to the average container fill height. This electrical potential is compared with another potential representing desired fill height and whenever their difference exceeds preset limits, a controller is actuated to vary the amount of material being delivered to individual containers by the dispensing machine. Fill material may be defined as any substance, liquid or non-liquid, including viscous and semi-solid fluids as well as solid material in powdered, granular, amorphous or other comminuted form, the volume of which is controllable.

Accordingly, it is a primary object of this invention to provide a system which accurately measures the height to which containers emanating from a dispensing machine are filled.

It is another object of this invention to provide a system which measures minute variations in the average fill height of containers emanating from a dispensing machine.

Another object of this invention is to provide a system which reliably and closely controls container fill height about a desired level.

Still another object of this invention is to provide a system which more economically controls a dispensing process.

It is an additional object of this invention to provide a system capable of controlling container fill height about any desired level.

A further object of this invention is to provide a system which is easily adaptable to modern industrial applications involved in material dispensing.

Still a further object of this invention is to provide a system utilizing a simple inexpensive source of radiation not requiring bulky power equipment for proper operation.

Numerous other objects and features of the present invention will become apparent upon reference to the following description taken in conjunction with the accompanying drawings, in which:

FIG. 3 is a top sectional view of the radiation source-detector unit shown in FIG. 1 embodying the principles taught by the present invention;

FIG. 4 is an enlarged sectional view taken on the line 4—4 of FIG. 3;

FIG. 5 is a graph of detected radiation time for an individual container fill height measurement method;

FIG. 6 is a graph similar to that of FIG. 5 with a slightly extended time axis illustrating a container fill height measuring method whereby the average fill height of a number of containers is determined.

Figure 1:
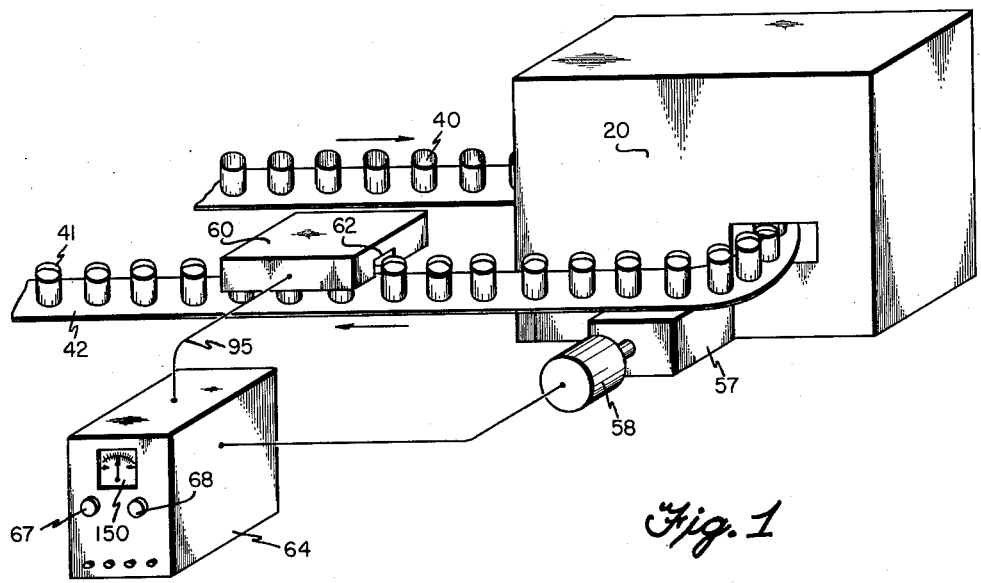
FIG. 1 is an isometric illustration of a dispensing machine and accompanying measurement and control system comprising a preferred embodiment of the present invention.

Referring now to the drawings and specifically to FIG. 1, a preferred embodiment of the present invention is illustrated as a control system for regulating a liquid dispensing machine 20. Empty containers 40 are transported by means of a moving conveyor 42 through the dispenser 20 wherein a specific quantity of liquid is supplied to each container 40. The amount of liquid placed in each container 40 is controllable by a reversible motor 58 coupled to the dispenser 20 by suitable gear reduction means shown generally at 57. Dispenser 20 may assume the form of any of the well known devices operable to dispense a controllable volume of liquid to individual containers 40.

As filled containers 41 leave the dispenser 20 they are conveyed under a radiation source-detector unit 60 connected by line 95 to a gauge-controller 64. As filled containers 41 travel through an undercut channel 62 extending the length of a radiation source-detector unit 60, their fill height is measured by suitable circuitry, as taught by the present invention, located in a gauge-controller 64. The radiation source-detector unit 60 is placed a certain distance above conveyor 42 which may be regulated by adjusting means not illustrated. This may simply consist of an overhanging stationary mounting plate carrying threaded studs secured to the top of source-detector unit 60. These studs may pass upwardly through the mounting plate and be secured thereto by locknuts. Clockwise or counterclockwise rotation of the locknuts would correspondingly raise or lower the source-detector unit 60 with respect to the conveyor 42.

The fill height of containers 41 may be read on a suitable indicating device such as a contact meter 150. Sensitivity and zero positioning of the contact meter 150 may be respectively adjusted by manual setting of the front panel control knobs 67 and 68. If the liquid level in containers 41 exceeds the upper or lower limits as set by a span adjusting means on the contact meter 150, a control circuit actuates the reversible motor 58, over line 59, to turn in a direction and for a length of time as required to bring the liquid level in filled containers 41 within the desired limits. A more detailed explanation of the controlling section of gauge-controller 64 is described hereinafter.

Figure 2:
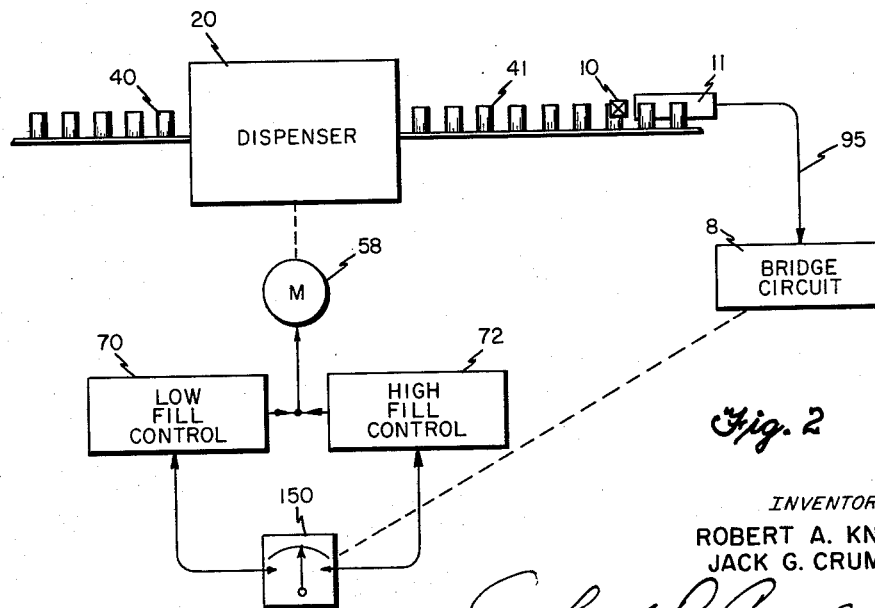
FIG. 2 is a diagrammatic representation of the system described in FIG. 1.

Referring now to FIG. 2, a diagrammatic illustration of the system set forth in FIG. 1, filled containers 41 are shown passing between a radioactive source 10 and a radiation detector 11. The output of detector 11 is applied via cable 95 to a measuring bridge circuit 8. The contact meter 150 is coupled to the bridge 8 and is operable to actuate either a low fill controller 70 or a high fill controller 72. These controllers are in turn connected to the reversible motor 58.

Actuation of the low fill controller 70 causes motor 58 to rotate in such a direction that the dispenser 20 is forced to deliver more fill material to the empty containers 40. If the bridge circuit 8 is unbalanced indicating that containers 41 are being over-filled, the high fill controller 72 will be actuated to turn motor 58 in the opposite direction. Then the amount of fill material dispensed will be less. The control of dispenser 20 is therefore dependent on the electrical signals representing container fill height transmitted by the detector 11 to the bridge circuit 8.

In order that the amount of fill being placed in containers 40 by dispenser 20 may be more economically controlled, the present invention provides a measuring system that will determine changes in the fill height of containers 41. It is the general purpose of the source-detector unit 60 in FIG. 1 to sense the fill height of containers 41 passing therethrough and to deliver an electrical signal indicative of said height to the gauge-controller 64. A nuclear source of radiation is so arranged that the radiation passing through the filled containers 41 and striking the detector is translatable into an electrical voltage relating to the fill height of containers 41.

Referring to FIG. 3, the relative horizontal displacements of a radiation source 10, containers 41 and detector 11 are shown in a top plan sectional view of the source-detector unit 60. The sectional view was formed by passing a plane through the source-detector unit 60 parallel to the conveyor 42. The generally rectangular source-detector unit 60 may be constructed of suitable metallic material selected for outside appearance as well as to minimize the hazard of external radiation. Extending throughout the longitudinal dimension of source-detector unit 60 is a channel 62 formed by the upwardly extending walls 94 and 96 terminating in a mounting plate (not shown) which divides the source-detector unit 60 into an upper and lower compartment. The undercut channel 62, therefore, divides the lower compartment of the source-detector unit 60 into two sections. One section contains a small radiation source 10 and shutter mechanism (not shown) while the other section contains a detector 11 which may consist of three Geiger-Müller tubes 11a, 11b and 11c. Detector 11 may, however, be an ionization chamber or other electrical voltage generator responsive to nuclear radiation. The G-M tubes 11a, 11b and 11c are placed diagonally opposite the radiation source 10 and parallel to the line of travel of filled containers 41 forming an angle approaching $\pi/6$ radians therewith.

This offset arrangement of G-M tubes 11a, 11b and 11c and radiation source 10 is utilized to permit the fill height of a number of containers 41 to be measured at the same instant of time as well as to remote the G-M tubes 11a, 11b and 11c from the radiation source 10. The filled containers 41 proceeding in the direction indicated by the arrow are so spaced on conveyor 42 that at least a major portion of each container 41 is always disposed between radiation source 10 and G-M tubes 11a, 11b and 11c. The average value of radiation passing through containers 41 will thus be sensed by the source-detector unit 60. This average value of radiation corresponds to the average height to which containers 41 are filled.

A cable 95 couples the output of the electrically parallel-connected G-M tubes 11a, 11b and 11c to suitable measuring circuits located in gauge-controller 64. The use of multiple radiation detectors has the advantage over the use of a single detector of increasing the efficiency of detection of gamma radiation by affording a larger detector wall area for reaction with the gamma rays. Similarly the multiple detectors reduce the source requirement needed to give the number of counts necessary for measurement at a preferred signal-to-noise ratio.

Reference may now be had to FIG. 4 illustrating the relative vertical arrangements of radiation source 10, detector 11 and filled container 41 with regard to the desired fill height Hc. FIG. 4 is a partial sectional view taken on the line 4—4 of FIG. 3, showing the coplanar relationship of the radiation source 10 and the G-M tubes 11a, 11b and 11c. The container 41 is shown as being properly filled to the desired height Hc. Although radiation issues from source 10 in all directions, only that radiation capable of striking the G-M tubes 11a, 11b and 11c, is suitable for determining container fill height. An angle $\theta$ of useful radiation is that angle from radiation source 10 subtended by the G-M tubes 11a, 11b and 11c.

The radiation source 10 may comprise a radioactive material such as cesium 137 which is primarily a gamma ray emitter and of a configuration as set forth in copending application, Serial No. 730,347, filed April 23, 1958, by Jack G. Crump. It should be noted that the source-detector unit 60 is so positioned above the conveyor 42 that the plane of source 10 and G-M tubes 11a, 11b and 11c passes through the desired fill height Hc. It may be observed, however, that the fill level of containers 41 may fluctuate between a minimum height H1 and a maximum height H2 and still change the intensity of the rays striking the detector.

All values of fill level below H1 cause the G-M tubes 11a, 11b, and 11c to intercept a relatively large amount of radiation. Accordingly, if the containers 41 are filled to any level above height H2, the container 41 absorbs a large measure of radiation so that the response of G-M tubes 11a, 11b and 11c remains at a constant low value. The amount of decrease in detector response that occurs is a function of the mass of the container 41 and its contents, and the energy level of radiation utilized, as well as numerous other variables well known to those skilled in the art. Therefore, only those changes in fill level between heights H1 and H2 are perceptible as changes in radiation level by the G-M tubes 11a, 11b and 11c.

The advantages of the present invention realized through the measurement of the average container fill height and achieved through the offset arrangement of the radiation source 10 and G-M tubes 11a, 11b and 11c shown in FIG. 3, may be more fully appreciated by referring to FIG. 5 and FIG. 6. If the radiation source 10 were to be placed directly across from the radiation source 10 so that their centerline passed perpendicular to the line of travel of containers 41, each container 41 would be individually measured. However, as observed in FIG. 5, the detected radiation would vary immensely as each container 41 passed between the source and detector. The curve 98 representing the changes in radiation level at the detector of such a configuration, would possess high segments 98a and low segments 98b. As a space between containers 41 and the containers themselves consecutively pass between the source and detector, segments 98a and 98b respectively signify the relative high and low values of radiation percepted by the detector. The average of these changes in radiation level is represented by the dotted line 99. It should be apparent that, due to the high levels of radiation encountered between successive containers 41, a slight change in container fill level is not readily observed in the average value of radiation detected.

Offsetting the G-M tubes 11a, 11b and 11c produces a curve 100 as shown in the graph of FIG. 6 wherein curve 100 represents the varying radiation level detected by the G-M tubes 11a, 11b and 11c as a plurality of containers 41 pass through the source-detector unit 60 in FIG. 1. The average value of the deviations of curve 100 is represented by the dotted line 101. Inasmuch as radiation detected is related to container fill height, the curve 100 corresponds to the measured fill height deviations of containers 41. Whereas the curve 100 digresses only slightly from curve 101, a sudden change in container fill height will be readily apparent in the average mean value of detected radiation.

Figure 7:
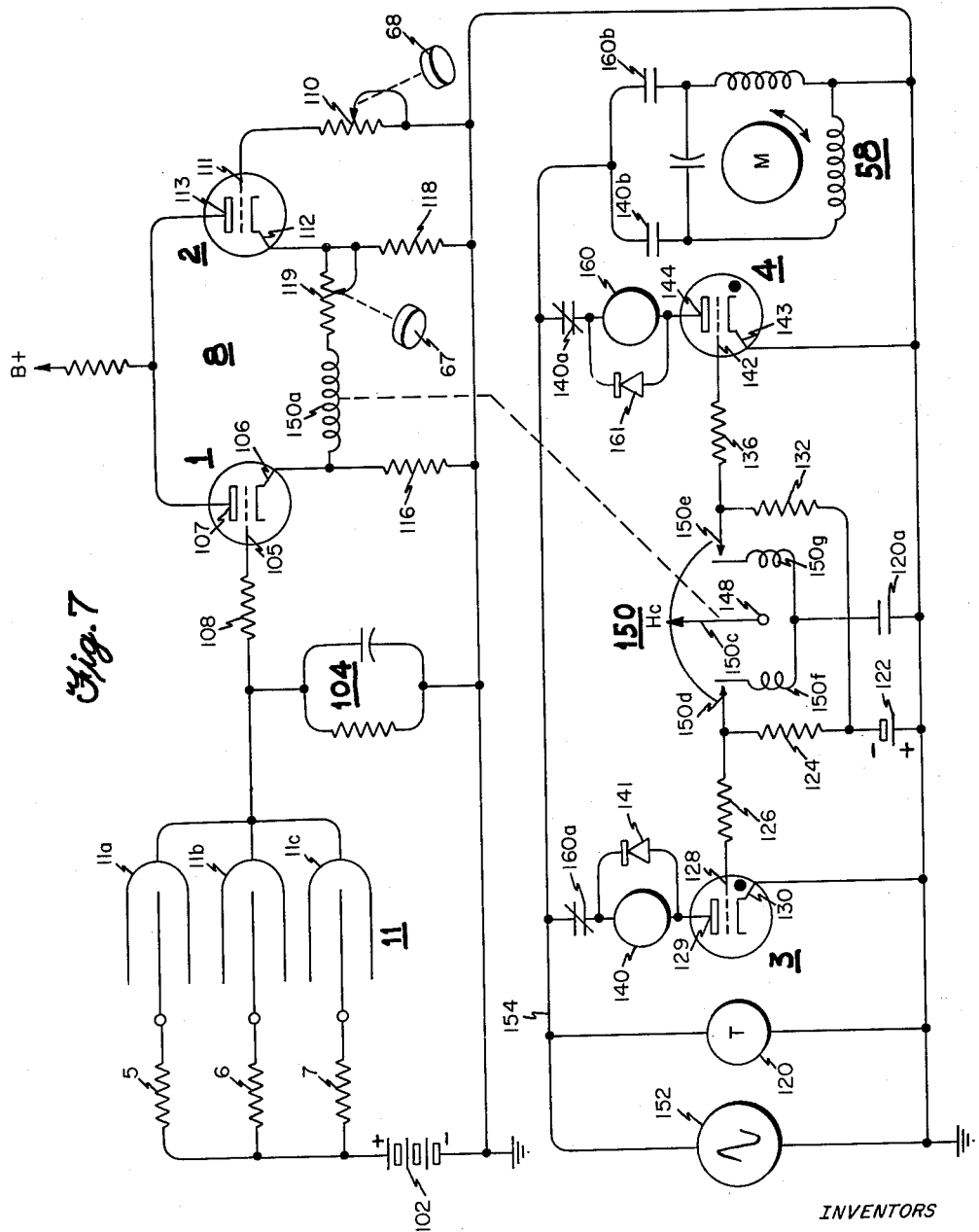
FIG. 7 is a schematic drawing of the measuring and controlling circuitry utilized in the present invention.

The principles governing the relative dispositions of radiation source 10 and G-M tubes 11a, 11b and 11c particular to the present invention, are operable in conjunction with measuring and controlling circuitry responsive to the average electrical voltage output of the G-M tubes 11a, 11b and 11c. With reference to FIG. 7, generally, the combined electrical output of G-M tubes 11a, 11b and 11c is integrated at 104 and coupled to a bridge circuit comprising triode tubes 1 and 2 and associated components, including a sensitive bridge balance indicator, contact meter 150. A swinging needle 150c responsive to the magnitude of bridge unbalance is arranged to actuate either a low fill control loop depending on the magnitude and direction of bridge unbalance. A gas-filled thyratron tube 3, relay 140 and control motor 58 comprise the low fill control loop while a gas-filled thyratron tube 4, relay 160 and control motor 58 comprise the high fill control loop. The low fill control loop and the high fill control loop have opposite control of the reversible control motor 58 to respectively increase and decrease the volume of pockets 30 in the dispensing machine 20.

Specifically, an electrical potential is applied to the parallel-connected G-M tubes 11a, 11b and 11c through their respective isolating resistors 5, 6 and 7 by a voltage source represented by a battery 102. The shells of the G-M tubes 11a, 11b and 11c are connected to an R-C integrator 104 having a nominal time constant of 6 seconds and to the grid element 105 of triode tube 1 by means of a grid current limiting resistor 108. The grid element 111 of triode tube 2 is connected to ground through a variable resistive element referred to as a zero positioning potentiometer 110, whose active resistance may be adjusted by control knob 68. The cathode element 106 of tube 1 and the cathode element 112 of tube 2 are respectively grounded through equal resistive elements 116 and 118. Serially connected between the cathodes 106 and 112 are the signal coil 150a of the contact meter 150 and a potentiometer 119 referred to as a sensitivity adjustment, controllable by knob 67. The anode element 107 of tube 1 and the anode element 113 of tube 2 are commonly connected by means of a plate load resistor 109 to a source of positive voltage represented by the conventional B+ symbol.

The indicating needle 150c is coupled to the signal coil 150a and is pivotally mounted at point 148. The indicating needle 150c also bears insulated contacts. To one side of the indicating needle 150c is placed a hold coil 150f slightly separated from an adjustable low limit contact 150d which is coupled to the common junction of resistors 124 and 126. An analogous arrangement is placed on the other side of the indicating needle 150c regarding hold coil 150g and an adjustable high limit contact 150e which is connected to the common junction of resistors 132 and 136. The hold coils 150f and 150g are commonly connected to ground via normally open contacts 120a of a transportation delay timer 120.

The grid element 128 of the gas-filled thyratron tube 3 is connected to a source of bias represented by the battery 122 through a series connection of resistors 126 and 124. The cathode element 130 of thyratron tube 3 is at ground potential while an A.C. potential is supplied to the anode element 129 over line 154 connected to a convenient source of A.C. voltage 152. A plate relay 140, arranged in parallel relationship with a unidirectional device such as a diode 141, and normally closed contacts 160a are serially inserted between the anode 129 and the supply line 154.

Grid element 142 of the gas-filled thyratron tube 4 is likewise connected to the battery 122 but through resistors 132 and 136. The cathode element 143 is grounded and another plate relay 160, placed in parallel with a diode 161, is serially connected with normally closed contacts 140a to couple the anode element 144 of tube 4 to supply line 154. Power is also transmitted over line 154 to a continuously running transportation delay timer 120 and through normally open relay contacts 140b and 160b to the fields of the reversible control motor 58. Delay timer 120 may be adjusted to allow periodic closure of contacts 120a for a variable length of time in a manner described hereinafter.

The following adjustments of the contact meter 150 must be made before reliable control of the dispensing process can be had. As soon as it is determined through visual inspection that containers 41 are being filled to the desired height Hc, the measuring bridge 8 must be balanced by varying the zero positioning potentiometer 110 until the indicating needle 150c rests at center scale. The contact meter 150 indicates that the desired fill height Hc is being attained. Next, the span of the contact meter 150 must be set by varying the spacing between the movable low and high limit contacts 150d and 150e. This determines the limits of the system's dead band. Dead band may be defined as that narrow range in container fill height deviations to which the controller is not responsive. Thus, control of dispenser 20 is only undertaken whenever the measured fill height exceeds the limits of the dead band. This dead band may be of any desired width within the detectable fill heights H1 and H2. Lastly, the control knob 67 establishes the sensitivity of the contact meter 150 by regulating the maximum amount of current which can flow through the signal coil 150a for a given difference in cathode potentials. Thus determined, is the amount of current flow in the signal coil 150a needed for full scale deflection of the indicating needle 150c.

In the following detailed operation of the measuring and controlling components embodied in the present invention, it will initially be assumed that the dispenser 20 of FIG. 1 is filling containers 41 to a level below the lower edge of the preset dead band. Comparisons which may be inferred during the detailed description of operation are made relative to those circumstances existing under desired fill height conditions. Inasmuch as a lesser quantity of absorber prevails between the radiation source 10 and G-M tubes 11a, 11b and 11c, an increase in radiation level is detected. The electrical potentials generated by the G-M tubes 11a, 11b and 11c grow increasingly positive as they are bombarded by the increased radiation. The sum of these positive potentials are averaged by the integrator 104 and applied to the grid 105 of triode 1. Reacting to an increase in positive grid potential, triode 1 conducts a correspondingly greater quantity of plate current which in turn increases the positive potential on the cathode 106. The measuring bridge circuit will be unbalanced due to the potential difference between cathode 106 and cathode 112. Since a potential is now applied across the signal coil 150a and potentiometer 119, current will flow in the signal coil 150a in such a direction as to compel the indicating needle 150c to swing to the left of the Hc position shown in FIG. 7.

The indicating needle 150c will deflect so as to cause the hold coil 150f to engage the low limit contact 150d. Upon closure of delay timer contacts 120a, battery 122 draws current through hold coil 150f and resistor 124. Current flowing in the hold coil 150f sets up a magnetic field tending to secure the indicating needle 150c to the left. The cutoff potential previously applied to the grid 128 of thyratron tube 3 is substantially reduced to ground potential. Thyratron tube 3 heavily conducts plate current thereby energizing relay 140. Diode 141 reduces relay contact chattering to insure positive switching action of relay 140. Relay contacts 140a remove plate voltage from thyratron tube 4 and the closure of contacts 140b causes the control motor 58 to rotate in a clockwise direction.

The closure of contacts 120a initiates the control period during which the motor 58 is actuated if an adjustment is necessary. The duration of each control period and the number of control periods in a given length of time must be computed for the particular process being controlled. Factors, such as dispenser speed, container spacing, distance from the dispenser to the radiation source-detector unit 60 and the gearing arrangements coupling the control motor 58 to the dispenser 20 must first be resolved before an optimum adjustment of delay timer 120 can be effected. Generally, delay timer 120 disconnects the control circuitry for a period of time sufficient to allow a foregoing adjustment to be measured at the radiation source-detector unit 60.

In a particular control period, the motor 58 may or may not cause sufficient adjustment of dispenser 20 to correctly fill containers 41 within the desired limits set by the span of the contact meter 150. After sufficient time has elapsed for the results of the previous corrective action to be measured, the motor 58 will again be actuated if the containers 41 are still being filled below the minimum limit of span. A description of circuit operation to correct for an overfilling of containers 41 will be omitted as it will be obvious to those skilled in the art.

The foregoing description of a preferred embodiment of the present invention should be considered exemplary since numerous changes, additions and omissions may be made thereto without departing from the spirit and scope of the invention.

What is claimed is:

1. An automatic dispensing machine for filling successive unit containers with a volume of material said machine including means for varying said volume, comprising: a nuclear energy source and detector means for diagonally positioning said detectors with respect to said source on the opposite side of said containers at an angle determined by the size of said containers and the spacing therebetween to maintain a continuous absorber between said source and said detector, circuit means connected to said detector to continuously provide an electrical signal translatable to the average fill height of said material in successive containers being filled, a comparator including voltage generating means for producing a voltage identifiable as a predetermined fill height and means for comparing said generated voltage with said translatable signal to derive a difference voltage, means connecting said difference voltage to said varying means to vary said volume in accordance with said difference signal.

2. An automatic dispensing machine for filling successive unit containers with a volume of material said machine including means for varying said volume, comprising: a radioactive source and a radiation detector means for diagonally positioning said detectors with respect to said source on the opposite side of said containers at an angle determined by the size of said containers and the spacing therebetween to maintain a continuous absorber between said source and said detector, circuit means connected to said detector to continuously provide an electrical voltage translatable to the average fill height of said material in successive containers being filled, a comparator circuit including a voltage generator operative to generate a comparison voltage identifiable as a predetermined fill height and means for comparing said comparison voltage with said translated voltage to derive a difference voltage having a sense and degree indicative of the fill height of said containers above and below said predetermined height, means connecting said difference voltage to said varying means to vary said volume in accordance with said signal.

3. An automatic dispensing machine for filling successive unit containers with a volume of material said machine including means for varying said volume, comprising: a radioactive source and a radiation detector means for diagonally positioning said detectors with respect to said source on the opposite side of said containers at an angle determined by the size of said containers and the spacing therebetween to maintain a continuous absorber between said source and said detector, circuit means connected to said detector to continuously provide an electrical voltage translatable to the average fill height of said material in successive containers being filled, a comparator circuit including a voltage generator operative to generate a comparison voltage identifiable as a predetermined fill height and means for comparing said comparison voltage with said translatable voltage to derive a difference voltage having a sense and degree indicative of the fill height of said containers above and below said predetermined height; a low fill controller, a high fill controller, a balanced driving means connected to said varying means and to said controllers, means selectively connecting said difference signal to one of said controllers to either decrease or increase said volume in accordance with said difference signal.

4. An automatic dispensing machine for filling successive unit containers with a volume of material said machine including means for varying said volume, comprising: a radioactive source and a radiation detector, a housing diagonally positioning said detector with respect to said source on the opposite side of said containers at an angle determined by the size of said containers and the spacing therebetween to maintain a continuous absorber between said source and said detector, circuit means having connected thereto said detector and operable to provide an electrical voltage translatable to the average fill height of said material in successive containers being filled, a comparator circuit including a voltage generator operative to generate a comparison voltage identifiable as a predetermined fill height, means for comparing said comparison voltage with said translated voltage to derive a difference voltage having a sense and degree indicative of the fill height of said containers above and below said predetermined height, and means connecting said difference voltage to said varying means to vary said volume in accordance with said signal.

5. An automatic dispensing machine for filling successive unit containers with a volume of material said machine including means for varying said volume, comprising: a radioactive source and a radiation detector, a housing diagonally positioning said detector with respect to said source on the opposite side of said containers at an angle determined by the size of said containers and the spacing therebetween to maintain a continuous absorber between said source and said detector, circuit means having connected thereto said detector and operable to provide an electrical voltage translatable to the average fill height of said material in successive containers being filled, a comparator circuit including a voltage generator operative to generate a comparison voltage identifiable as a predetermined fill height and means for comparing said comparison voltage with said translatable voltage to derive a difference voltage having a sense and degree indicative of the fill height of said containers above and below said predetermined height; a low fill controller, a high fill controller, a balanced driving means connected to said varying means and to each of said controllers, a contact meter having a pair of contact points, one of said points connected to said low fill controller and the other of said points connected to said high fill controller, and means connecting said difference signal to said contact meter to actuate said meter and thereby cause an unbalance in said driving means.

6. An automatic dispensing machine for filling successive unit containers with a volume of material, said machine including means for varying said volume, comprising: a radioactive source and a radiation detector, a housing diagonally positioning said detector with respect to said source on the opposite side of said containers at an angle determined by the size of said containers and the spacing therebetween to maintain a continuous absorber between said source and said detector, circuit means having connected thereto said detector including an integrator for integrating the output of said detector to provide an electrical voltage translatable to the average fill height of said material in successive containers being filled; a comparator circuit including a voltage generator operative to generate a comparison voltage identifiable as a predetermined fill height and means for comparing said comparison voltage with said translatable voltage to derive a difference voltage having a sense and degree indicative of the fill height of said containers above and below said predetermined height; a low fill controller, a high fill controller, a bridge circuit connecting said integrator to said controllers, and a balanced driving means connecting said controllers to said varying means, said driving means becoming unbalanced when said integrated signal deviates from said predetermined amount.

7. In an automatic dispensing machine for filling successive unit containers with a volume of material, said machine including means for varying said volume, means for measuring and controlling said volume of material, comprising: a radioactive source and a radiation detector fixedly positioned on opposite sides of said dispensed containers said detector responsive to the variation in the radiation level to provide a voltage indicative of the fill height in successive containers being filled, an integrator for averaging said voltage to provide a voltage translatable to the average fill height of said containers, a balanced bridge circuit including a contact meter circuit, said contact meter further including a pair of contacts and wherein an unbalance in said bridge actuates one of said contacts, a low fill controller connected to one of said contacts and a high fill controller connected to the other of said contacts, a driving means connected to said volume varying means driven by one of said controllers when the fill level of said containers is in a first condition and driven by the other of said controllers when the fill level of said containers is in a second condition.

8. An automatic dispensing machine for filling successive unit containers at a given rate with a volume of material and having means for varying said volume, comprising: a nuclear energy source and detector, means for diagonally positioning said detector with respect to said source on the opposite side of said containers at an angle determined by the size of said containers and the spacing therebetween to maintain a continuous absorber between said source and said detector, circuit means connected to said detector to provide an electrical signal translatable to the average fill height of said material, a comparator including voltage generating means for producing a voltage identifiable as a predetermined fill height and means for comparing said generated voltage with said translatable signal to derive a difference voltage, means connecting said difference voltage to said varying means to vary said volume in accordance with said difference signal means, and a delay timer connected to said last named means to render the same operative and inoperative in accordance with said given rate of filling said containers.

References Cited in the file of this patent

UNITED STATES PATENTS

| | | |
|---|---|---|
| 2,132,447 | Stout | Oct. 11, 1938 |
| 2,179,859 | Page | Nov. 14, 1939 |
| 2,613,326 | Herzog | Oct. 7, 1952 |
| 2,732,503 | Jacobs | Jan. 24, 1956 |
| 2,763,789 | Ohmart | Sept. 18, 1956 |
| 2,763,790 | Ohmart | Sept. 18, 1956 |
| 2,815,759 | Molins et al. | Dec. 10, 1957 |